United States Patent [19]

Kishine et al.

[11] Patent Number: 4,644,431
[45] Date of Patent: Feb. 17, 1987

[54] MAGNETIC HEAD FOR A PERPENDICULAR MAGNETIC RECORDING SYSTEM

[75] Inventors: Nobuyuki Kishine; Tetsuya Imamura, both of Utsunomiya; Hideyuki Minami, Tochigi; Michihide Yamauchi, Wakayama, all of Japan

[73] Assignee: Kao Corporation, Tokyo, Japan

[21] Appl. No.: 677,059

[22] Filed: Nov. 30, 1984

[30] Foreign Application Priority Data

Nov. 30, 1983 [JP] Japan ................................ 58-227728

[51] Int. Cl.$^4$ ................................ G11B 5/22
[52] U.S. Cl. ................................ 360/122
[58] Field of Search ................ 360/122, 125, 126

[56] References Cited

FOREIGN PATENT DOCUMENTS 0034898 9/1978 Japan ................................ 360/122
0132322 11/1978 Japan ................................ 360/122

OTHER PUBLICATIONS

DCIC Report 68-2, "A Review of Glasslike Carbons", 11 pages, pub. by Battelle Memorial Institute, author: S. Yamada.

Primary Examiner—Robert S. Tupper
Attorney, Agent, or Firm—Cushman, Darby & Cushman

[57] ABSTRACT

A magnetic head for recording and reading out of a magnetic recording medium in a perpendicular magnetic recording system is described in which the surface which is close to or in contact with the recording medium are covered with a film of a glasslike carbon material. This film improves the lubrication properties with respect to the adjacent recording medium and serves to prevent abrasion.

5 Claims, 2 Drawing Figures

MAGNETIC HEAD FOR A PERPENDICULAR MAGNETIC RECORDING SYSTEM

BACKGROUND OF THE INVENTION

This invention relates to a magnetic head which records in and reads out of a magnetic memory medium and, more particularly to a magnetic head used in a perpendicular magnetic recording system which records a plane magnetic recording medium having an axis of easy magnetization vertical to the plane with a vertical magnetic field component.

Perpendicular magnetic recording systems like the one mentioned above and longitudinal recording systems represent currently available magnetic recording systems. The longitudinal recording system has been theoretically proven to have a limitation in high density recording; see S. Iwasaki, Gakkai Jiki Kiroku Kenkyu Shiryo MR 72 - 7 (1972) and S. Iwasaki and K. Takamura, IEEE Trans. On Magn. MAG - 11, No. 5, pp. 1173-1175 (1980).

In recent years research and development activities have concentrated on the perpendicular magnetic recording system which is a recording system for magnetization vertical to the plane of the recording medium and is suitable for high density recording.

A conventional magnetic head will be described with reference to the first of the attached Figures. FIG. 1 is a perspective view of the structure of a prior art magnetic head used in a perpendicular magnetic recording system. The prior art magnetic head comprises a main pole 3 supported by a support 2 which vertically contacts the surface of a magnetic recording medium 1 and an auxiliary pole 5 having a coil 4 on the outer periphery which does not contact the magnetic recording medium.

Main pole 3 directly contacts the magnetic recording medium and generally comprises a thin film of a magnetic soft metal, such as Permalloy, Alperm, Sendust or Borocube, and a support 2 for protecting the thin film which is made of thermoplastic resin, thermosetting resin or alumina ceramic.

Auxiliary pole 5 is disposed opposite to the main pole 3 via the magnetic recording medium and is frequently made of sintered manganese-zinc-ferrite. Although this auxiliary pole 5 should not directly contact the magnetic recording medium 1, it is preferable in design to arrange the pole 5 as close as possible to the medium 1 for convenience in recording and reproduction. This necessitates a minute gap between the auxiliary pole 5 and the magnetic recording medium 1, but if such a gap is provided due to the deflection and strain on the recording medium 1, or an uneven thickness of an individual recording medium 1, the auxiliary pole 5 is likely to contact the recording medium 1, thus presenting a problem.

Figure 1:
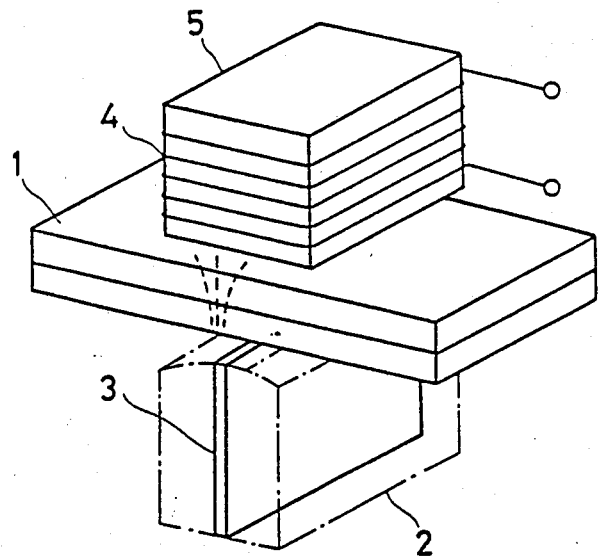
FIG. 1 is a perspective view of a magnetic head according to the prior art for use in a perpendicular magnetic recording system.

It is an object of the present invention to obviate the aforementioned defects of the prior art and to provide a magnetic head for a perpendicular magnetic recording system which does not require a minute gap to be maintained between a magnetic recording medium and an auxiliary pole and yet superior in performance.

DETAILED DESCRIPTION OF THE INVENTION

This invention relates to a magnetic head which can be used for a perpendicular magnetic recording system which records with a vertical magnetic field component a magnetic recording medium in a plane form having an axis of easy magnetization which is vertical to the plane. The magnetic head includes a main pole containing a soft magnetic thin film and an auxiliary pole disposed opposite to the main pole. The main pole and the auxiliary pole are separated by the magnetic recording medium. The disclosed magnetic head is characterized by a structure in which at least the portion of the auxiliary pole surface which is close to said magnetic recording medium is covered with a thin surface film of a nonmagnetic member containing a glass-like carbon material.

The film surface is made of an aggregate of glasslike carbon materials and/or an aggregate of a composite material of primarily glasslike carbon materials and is shaped in a manner to increase the thickness in cross-section at substantially the center of the surface opposing the magnetic recording medium in the direction parallel to the advancing direction of the medium. Preferably the film surface has a maximum thickness of from 3 to 20 $\mu$m.

More specifically, one of the characterizing features of this invention is that either the entire auxiliary pole, or the portion thereof closest to the magnetic recording medium, is made of an aggregate of glasslike carbon material and/or an aggregate of a composite material containing vitreous carbon materials. If such an auxiliary pole is used, even if the auxiliary pole accidentally contacts the magnetic recording medium, there will be no problem in the magnetic recording and reproducing operations. As the recording medium is less likely to become damaged, no special efforts need be paid for minute gap formation between the main and auxiliary poles.

The terms "aggregate of glasslike carbon material" and "aggregate of composite material" as used herein means an aggregate in a form molded by case molding, compression molding, extrusion molding, or any other known molding method, or in the formation in which a glasslike carbon material is directly precipitated on the surface of the substrate, such as by sputtering, vapor deposition, and the like.

This invention will now be explained in more detail in a magnetic head of a perpendicular magnetic recording system according to this invention, either the whole of an auxiliary pole or that portion of the auxiliary pole which is closest to the magnetic recording medium is provided with an aggregate of glasslike carbon material and/or an aggregate of a composite material containing vitreous carbon materials.

Suitable glasslike carbon materials include the glasslike carbon material obtained by carbonizing a thermosetting resin; the glasslike carbon material obtained by carbonizing a resin which is modified to be a thermoset resin by copolymerization or co-condensation; the glasslike carbon material obtained by a chemical process in setting or carbonization for remarkably preventing crystallization; or the glasslike carbon material obtained by thermal decomposition of methane, ethylene, benzene or other low molecular weight carbon source in the gas phase. More specifically, the glasslike carbon material may be of polyacrylonitrile origin, rayon origin, pitch origin, lignin origin, phenol origin, furan origin, alkyd resin origin, unsaturated polyester origin, or of xylene resin origin.

The aggregate of composite materials including glasslike carbon materials as used herein means the aggregate of composite materials including the aforementioned glasslike carbon material together with a synthetic resin and/or a carbon filler. The synthetic resin may be any one of the thermoplastic resins such as PVC, polyvinyl acetate, polystyrene or any one of the thermosetting resins such as phenol, epoxy, polyester, furan, urea, melamine, alkyd, or xylene. The carbon filler as used herein means general carbon materials and may be, for example, a natural substance with a high residual carbon content such as lignin or pitches, an artificial graphite obtained by sintering a thermoplastic resin, carbon black made by the furnace method or the impact method, or naturally available graphite.

The thermosetting resin acts as a binder or matrix for fixing the glasslike carbon materials or vitreous carbon materials with the carbon filler and as a consequence, the aggregate of a composite material of such a thermosetting resin is superior in strength and rigidity against impact or other mechanical stresses. Thermosetting resins are therefore preferable to thermoplastic resins. In the case where a thermosetting resin is carbonized to obtain a glasslike carbon material, carbonization is easily performed if the carbon filler is added to the thermosetting resin. However, as the aggregate material tends to become uneven if a large amount of synthetic resin or carbon filler is mixed with the glasslike carbon, it is desirable to calculate the ratio of glasslike carbon material against the entire volume of aggregate material at 40 volume % or higher, and preferably at 50 volume % or higher.

The aggregate of glasslike carbon materials and/or aggregate of composite materials containing glasslike carbon materials may be manufactured by cast molding, compression molding, extrusion molding or any other known molding methods.

If the entire auxiliary pole is to be made of an aggregate of glasslike carbon material and/or an aggregate of composite material including a glasslike carbon material, the aggregate molded by the aforementioned molding method may be cut out or molded and finished in a desired shape and dimension, and may be ground to achieve the desired surface smoothness. If only the portion closest to the magnetic recording medium is to be provided with an aggregate of glasslike carbon material and/or an aggregate of a composite material including glasslike carbon material, such materials may be formed and applied onto the relevant auxiliary pole surface, such as by sputtering or evaporation on the desired face of a manganese-zinc-ferrite block or block of another suitable material. A block of aggregate material may be cut out, shaved, and ground to achieve a predetermined shape, dimension and surface smoothness, and then adhered to the manganese-zinc-ferrite block.

The gap between an auxiliary pole and a magnetic recording medium is generally in the range of about 10 to 20 $\mu$m. Considering recording and reproducing efficiency, the smaller the gap is, the better it is. But intentional contact between the auxiliary pole and the magnetic recording medium should absolutely be avoided. Accordingly, it is the usual practice to set the gap at a distance of 10 to 20 $\mu$m. The glasslike carbon material aggregate according to this invention is extremely effective in this regard as it can be formed as an extremely thin film by sputtering or other methods, is not itself magnetic, it does not damage the recording medium even if it accidentally contacts the medium, and it is superior in abrasion resistance.

Although the portion closest to the recording medium alone is covered with the material in preferred embodiments, the whole of the auxiliary pole may be covered if it is more convenient in manufacture.

The magnetic head for the perpendicular magnetic recording system according to this invention does not require provision of a minute gap between the magnetic recording medium and the auxiliary pole and does not damage the magnetic recording medium nor cause any problems in recording/reproducing even if it accidentally contacts the medium. These advantageous features are attributable to the non-magnetic property of the aggregate of glasslike carbon material and/or the aggregate of composite material including glasslike carbon materials, and the inherent lubrication property of the glasslike carbon material with the magnetic recording medium.

As the magnetic head according to this invention is superior in erosion resistance and chemical stability, it is durable and has a longer service life. If either the whole of the support of the main pole or that portion contacting the magnetic recording medium is structured with the aggregate of glasslike carbon material and/or the aggregate of composite material including glasslike carbon materials, uneven abrasion will not occur on the magnetic head because the magnetic head made of the same material aggregate contacts with the whole surface of the magnetic recording medium. This is another merit of the invention.

DESCRIPTION OF THE DRAWINGS

FIG. 1 is a perspective view of a magnetic head of a conventional perpendicular magnetic recording system.

Figure 2:
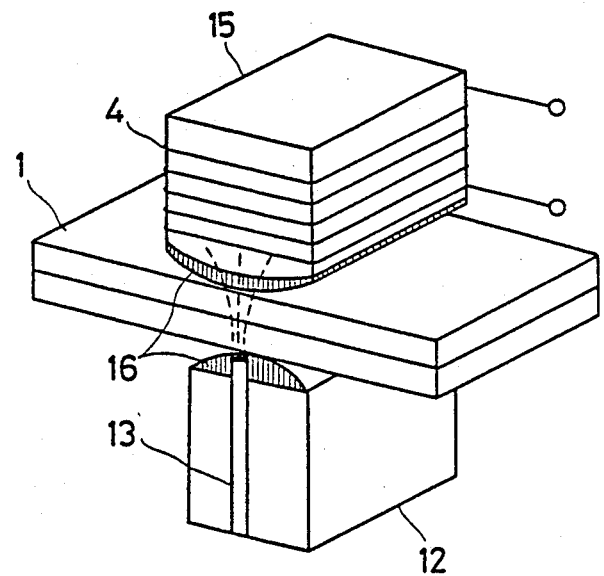
FIG. 2 is a perspective view of a magnetic head according to the present invention for use in a perpendicular magnetic recording system.

FIG. 2 is a perspective view of the structure of the magnetic head for a perpendicular magnetic recording system according to the present invention in which, for purposes of illustration, the thickness of the film surface 16 is somewhat exaggerated.

In these figures, the reference numeral 1 denotes a magnetic recording medium, 2, 12 supports, 3, 13 main poles, 4 a coil, 5, 15 auxiliary poles, and 16 a film surface of a glasslike carbon material aggregate.

In order to illustrate specific examples of the magnetic head for a perpendicular magnetic recording system according to this invention, the invention will now be described in more detail referring to preferred embodiments. The embodiments hereinbelow are shown only as examples and are by no means intended to limit the technical scope of this invention.

EXAMPLE 1

FIG. 2 shows the structure in perspective of the magnetic head according to this invention. The magnetic head of this invention comprises a main pole 13 of thin Permalloy film which is supported by a support 12 made of alumina ceramics vertically contacting the surface of a magnetic recording medium 1 and which has a film surface 16 of a glasslike carbon material aggregate on the surface contacting the magnetic recording medium 1. Also illustrated is an auxiliary pole 15 which has a film surface 16 of a glasslike carbon material aggregate in the form of an arc on the surface that is apt to come into contact with the magnetic recording medium 1. The auxiliary pole is formed of a sintered manganese-zinc-ferrite.

The auxiliary pole 15 was manufactured by processing a sintered manganese-zinc-ferrite 1 mm×1 mm×4 mm in size and abrading/sanding one end thereof with emery paper to obtain an arc having a 60 mm radius curvature. An aggregate of glasslike carbon material (having an apparent specific gravity of 1.49, a Shore hardness of 112 and a thermal conductivity of 3 kcal/mhr) was formed on the curved surface of the auxiliary pole 15 by sputtering on the arced surface to form a coating layer about 5 μm in thickness following the curvature of the arc.

To form the main pole 12 a Permalloy thin film is supported between two alumina ceramics pieces (manufactured by Nippon Denki Glass Kabushiki Kaisha; the product name NeoCerum) and the glasslike carbon material aggregate coating to form the main pole. A layer 16 of glasslike carbon material was used only for that portion of the main pole contacting directly with the magnetic recording medium.

An Fe—Ni film was formed on both surfaces of a polyethylene terephthalate film 50 μm in thickness by sputtering to an Fe—Ni thickness of 0.5 μm. Thereafter a Co—Cr film was further sputtered onto the Fe—Ni film to a thickness of 0.5 μm to prepare magnetic media discs of 20 KBPI (kilo bits/inch).

The auxiliary pole, main pole and disc were disposed in a manner so that the auxiliary pole and the main pole contacted the respective surfaces of the disc as shown in FIG. 2. The contact load was about 20 g.

The disc (8 inches in diameter; the poles contact the disc a total of 44 cm per revolution) was run for 500,000 revolutions and the reduction of reproducing output, the degree of abrasion on the auxiliary pole, and the extent of damage on the disc surface contacted by the auxiliary pole contact was assessed. The results are listed in the table below.

EXAMPLE 2

Instead of the glasslike carbon material aggregate used in the first example or embodiment, an aggregate of composite materials was prepared by mixing 10 volume % of carbon black powder (average size: 0.10 μm) and 90 volume % of thermosetting resin (comprising furfuryl alcohol, formalin, phenol), then hardening the mixture and carbonizing the same. This aggregate of composite material was applied on the tip end of the auxiliary pole and tested in the same manner as in Example 1. The results are listed on the table.

COMPARATIVE EXAMPLE A

An auxiliary pole was prepared by cutting out alumina ceramics (by Nippon Denki Glass Kabushiki Kaisha; the product name NeoCerum), and processing it with emery paper to form an arc of about 5 μm in thickness and 60 μm in radium of curvature as a replacement for the glasslike carbon material aggregate used above. The thus obtained alumina ceramic arc was attached on the tip of one end of sintered manganese-zinc-ferrite block with an adhesive agent (Araldite available from Ciba-Geigy) to form an auxiliary pole. The test was conducted in the same manner as above and the results are shown in the table below.

COMPARATIVE EXAMPLE B

Polymethylmethacrylate was dissolved in a solvent mixture of ethanol/carbon tetrachloride (mixing ratio 1:1 by weight) to form a coating on the auxiliary pole in place of the aggregate of glasslike carbon material used in Example 1. The polymethylmethacrylate solution was applied to one end of the same sintered manganese-zinc-ferrite block as used in Example 1 and the solvent was removed to form a polymethylmethacrylate film of about 5 μm in thickness as an auxiliary pole. The pole was tested in the same manner as in Example 1 and the results are reported below.

COMPARATIVE EXAMPLE C

Polytetrafluoroethylene (PTFE, Teflon ®, duPont) was used instead of the glasslike carbon material aggregate of Example 1. Although it was attempted to secure a piece of PTFE onto the tip of an auxiliary pole, the PTFE did not adhere to sintered manganese-zinc-ferrite. The PTFE was then cut out into a square column of 1 mm(h)×1 mm(w)×5 mm(l) which was processed with emery paper as before to obtain an arc of 60 mm radius of curvature. The test was conducted in the same manner as above to measure the degree of abrasion on the auxiliary pole and the extent of damage to the disc surface contacting the auxiliary pole. The results are shown in the table below.

TABLE

| Magnetic head | reduction in reproduction output (dB) | abrasion on auxiliary pole (μm) | degree of damage on on magnetic recording medium |
|---|---|---|---|
| Example 1 | 0 | 1.0 | none |
| Example 2 | 0 | 1.0 | none |
| Comparative Example A (ceramic) | 0 | 0 | Co—Cr sputtered film became excessively peeled |
| Comparative Example B (methacrylate) | 0 | 3.2 | Resin was adhered and Co—Cr sputtered film became peeled. |
| Comparative Example C (PTFE) | — | 3.4 | Resin was adhered and Co—Cr sputtered film became peeled |

What is claimed is:

1. A magnetic head for use in a perpendicular magnetic recording system which records with a vertical magnetic field component onto a magnetic recording medium with a plane surface and having a receiving circuit axis for easy magnetization which is vertical to the plane, said magnetic head comprising a main pole including soft magnetic thin film having a high magnetic permeability and a high saturated magnetic flux density, and an auxiliary pole which is disposed opposite said main pole so as to be separated via said magnetic recording medium, said magnetic head having at least the portion of said auxiliary pole confronting said magnetic recording medium covered with a non-magnetic film surface comprising a glasslike carbon material.

2. The magnetic head for a perpendicular magnetic recording system as claimed in claim 1 in which the material of the film surface is an aggregate of glasslike carbon material.

3. The magnetic head for a perpendicular magnetic recording system as claimed in claim 1 in which the material of the film surface is an aggregate of a composite material consisting mainly of a glasslike carbon material.

4. The magnetic head for a perpendicular magnetic recording system as claimed in claim 1 in which the film surface is arcuate-shaped on the side adjacent the magnetic recording medium and has a thickness at the center in cross-section parallel to the advancing direction of the magnetic recording medium of from about 3 to 20 µm.

5. The magnetic head for a perpendicular magnetic recording system as claimed in claim 1 in which the main pole has a surface arranged for contacting said magnetic recording medium also covered with a non-magnetic film surface comprising a glasslike carbon material.

* * * * *